UNITED STATES PATENT OFFICE.

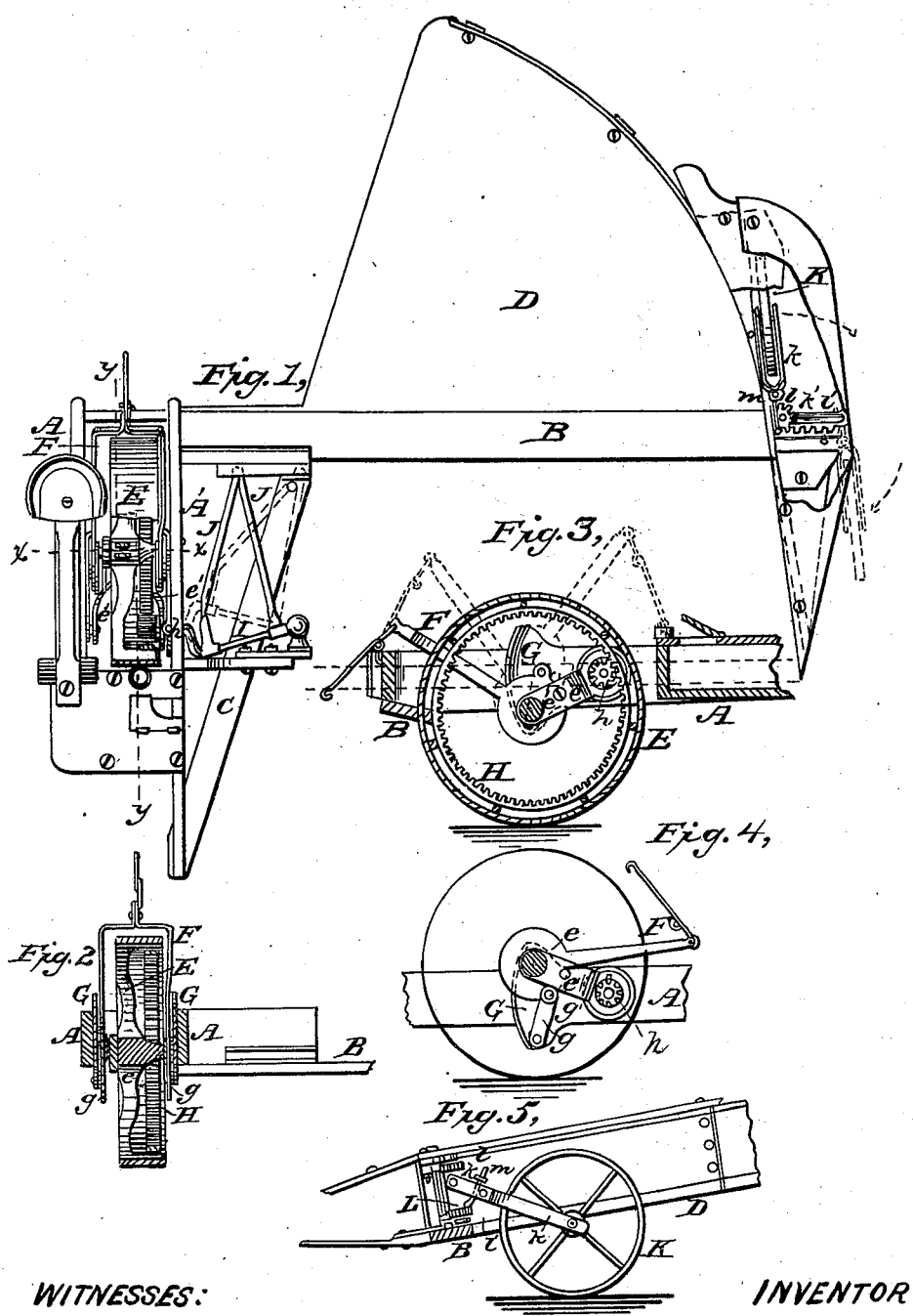

JOHN BARNES, OF ROCKFORD, ILLINOIS.

IMPROVEMENT IN HARVESTERS.

Specification forming part of Letters Patent No. 95,304, dated September, 28, 1869.

*To all whom it may concern:*

Be it known, that I, JOHN BARNES, of Rockford, in the county of Winnebago and State of Illinois, have invented a new and useful Improvement in Harvesters; and I do hereby declare that the following is a full and exact description of the same, reference being had to the accompanying drawings, and to the letters of reference marked thereon.

The object of the first part of my invention is to raise or lower the main frame and cutting apparatus on its supporting-wheel; and my improvement consists in combining a driving-wheel, mounted on radius-bars, vibrating around a center coincident with that of the counter-shaft which drives the cutters, with a frame oscillating around the main axle, and connected to the main frame by a link pivoted eccentrically to the main axle, by which mode of construction the main frame and cutting apparatus can be raised or lowered by oscillating the frame, as hereinafter more fully shown.

The next part of my invention relates to the grain-wheel. Its object is to impart a direct lateral as well as a swinging movement as the machine is backed, to enable it to turn more easily; and the improvement consists in combining, with the divider end of the finger-beam or platform of a harvester, a grain-wheel mounted on a fulcrum or pivot which moves laterally as well as axially in backing the machine.

The improvement further consists in combining a grain-wheel, a laterally-moving rotating spindle, a vertically-adjustable yoke, and an adjusting device to set the wheel higher or lower to regulate the height of that end of the finger-beam.

The accompanying drawings represent all the improvements herein claimed as embodied in a machine similar to that for which Letters Patent of the United States, numbered 85,722, were granted to me January 12, 1869.

Figure 1 represents a plan or top view of my improved machine; Fig. 2, a vertical transverse section through the main frame at the line $x\,x$ of Fig. 1; Fig. 3, a vertical longitudinal section through the same at the line $y\,y$ of Fig. 1; Fig. 4, a view showing the details of the adjusting devices; Fig. 5, a view in elevation, showing the grain-wheel.

A represents the main frame, to which the finger-beam B is attached. A diagonal brace, C, also connects the two. D is a platform of any well-known form. The driving-wheel E turns loosely on a fixed axle, $e$, mounted in radius-bars $e'$, pivoted to the main frame in line with the counter-shaft. The radius-bars $e'$ I, by preference, make each in two pieces, longitudinally adjustable by means of slots and set-screws to adjust the driving-wheel backward or forward in the frame, to insure the proper fit of the gearing. An oscillating or rocking frame, F, composed in this instance of two disks (one on each side of the driving-wheel) connected by a yoke, is mounted and turns loosely on the main axle. Links $g$, pin-jointed to the disks near their edges, are also pin-jointed to radius-plates G, fixed inside the frame; consequently, when the yoke F is turned backward or forward, the disks work on the pivot $g'$ as a fulcrum, and thus correspondingly raise or lower the main frame, the main axle always moving in the arc of a circle, of which the pinion $h$ forms the center. A seat, H, for the driver is mounted on an inclined standard, $h$, pivoted at $h'$ to the main frame in such manner that the seat may be set nearer to or farther from the driving-wheel. An internally-geared spur-wheel, H, inside the driving-wheel drives a corresponding pinion, $h$, on a counter-shaft, I. This shaft is bent or cranked, as shown in the drawing, and its outer end is supported in a ball-and-socket connection, $i$, as shown in my patent above mentioned. A pitman, J, projecting from the shaft, I drives the cutters, as explained in my former patent. The brace $j$ may be dispensed with without affecting the operation of the apparatus. The outer end of the finger-beam is supported by a grain-wheel, K, mounted in a yoke, $k$, movable vertically on its pivot $k'$, in a spindle L. This spindle is provided with cogs $l$ at top and bottom, gearing into corresponding racks $l'$ on the frame; consequently, when the machine is turned, and the grain-wheel swings outward from the frame, its spindle is moved laterally, as well as turned on its pivot, as shown by the dotted lines in Fig. 1.

The finger-beam can be adjusted higher or lower by means of a bolt, *m*, pivoted to the spindle, which bolt passes through the yoke, and is provided with a jam-nut to hold it at any desired point.

The ends of the spindle extend beyond the gears, and traverse in suitable slots in the frame to hold the spindle to its place while moving, and thus keep the gears engaged with the racks.

What I claim as my invention, and desire to secure by Letters Patent, is—

1. The combination of the main frame, driving-wheel, oscillating yoke-frame F, and links *g*, all constructed and operating as set forth.

2. The combination of the grain-wheel and its spindle with gears and a rack, substantially as set forth.

3. The combination of the vertically-moving grain-wheel yoke, with the adjusting-bolt on the spindle, as set forth.

This specification, signed and witnessed this 5th day of July, 1869.

JOHN BARNES.

Witnesses:
JNO. FAXON,
CLARA GOODALL.